(12) United States Patent
Kawabata et al.

(10) Patent No.: US 7,230,598 B2
(45) Date of Patent: Jun. 12, 2007

(54) ELECTRIC DIMMING DEVICE AND ITS DRIVING METHOD

(75) Inventors: Masaru Kawabata, Tokyo (JP); Toru Udaka, Kanagawa (JP); Toshiharu Yanagida, Tokyo (JP); Toshifumi Takaoka, Tokyo (JP); Kazuhiro Tanaka, Tokyo (JP)

(73) Assignee: Sony Corporation (JP)

(*) Notice: Subject to any disclaimer, the term of this patent is extended or adjusted under 35 U.S.C. 154(b) by 296 days.

(21) Appl. No.: 10/311,656

(22) PCT Filed: Apr. 19, 2002

(86) PCT No.: PCT/JP02/03923

§ 371 (c)(1),
(2), (4) Date: May 14, 2003

(87) PCT Pub. No.: WO02/086607

PCT Pub. Date: Oct. 31, 2002

(65) Prior Publication Data

US 2003/0189677 A1    Oct. 9, 2003

(30) Foreign Application Priority Data

Apr. 20, 2001  (JP) .............................. 2001-123171

(51) Int. Cl.
G09G 3/36    (2006.01)
(52) U.S. Cl. ............................ 345/87; 345/690; 355/83
(58) Field of Classification Search .................. 345/87, 345/88, 104, 207, 211, 690; 349/34, 96, 349/97, 100, 101; 355/35, 83, 36, 37
See application file for complete search history.

(56) References Cited

U.S. PATENT DOCUMENTS 5,191,435 A * 3/1993 Tsunekawa et al. ......... 386/117

(Continued)

FOREIGN PATENT DOCUMENTS

JP    07-005434    * 1/1995

(Continued)

OTHER PUBLICATIONS

Okumura, H., et al., "A New Low-image-lag Drive Method for Large-size LCTVs," Journal of the Society for Information Display, vol. 1, No. 3, Oct. 1993, pp. 335-339, XP002385604.

Primary Examiner—Richard Hjerpe
Assistant Examiner—Abbas I. Abdulselam
(74) Attorney, Agent, or Firm—Lerner, David, Littenberg, Krumholz & Mentlik, LLP

(57) ABSTRACT

An electrical dimmer device and its driving method applicable to, for example, an image pickup unit and a display unit operate so that when a control signal for stop adjustment is changed from its current value of stop adjustment to a larger value, which occurs when the light transmissivity of a positive type liquid crystal is raised, or when the light transmissivity of a negative type liquid crystal is lowered, the control signal is temporarily varied to an intermediate value that is larger than the larger value. The energy of the varied larger value and a time during which that varied value is applied are determined in accordance with predetermined values. By doing so, it is possible to make a response speed when changing the light transmissivity extremely faster and thus attain a response time, of for example, one field period of time or less required for a stop mechanism of a video camera.

36 Claims, 10 Drawing Sheets

U.S. PATENT DOCUMENTS 5,469,239 A * 11/1995 Ishida et al. .................. 396/96
5,686,021 A * 11/1997 Moriwaki et al. ..... 252/299.61
6,603,444 B1 * 8/2003 Kawanami et al. ........... 345/32
6,720,742 B2  4/2004 Yanagida et al.

FOREIGN PATENT DOCUMENTS

| | | |
|---|---|---|
| JP | 11-212065 | 8/1999 |
| JP | 2002-122843 | 4/2002 |
| JP | 2002-122845 | 4/2002 |
| WO | WO-87/01468 A1 | 3/1987 |
| WO | WO-99/65013 A1 | 12/1999 |

* cited by examiner

Circuit Portion

ELECTRIC DIMMING DEVICE AND ITS DRIVING METHOD

TECHNICAL FIELD

The present invention relates to an electrical dimmer (light adjustment) device and its driving method which are used with an image pickup unit, a display unit and the like. Particularly, it relates to an electrical dimmer device and its driving method which are preferably applied to a stop mechanism of the image pickup unit, a shutter mechanism of the image pickup unit or a display device of the display unit and the like.

BACKGROUND ART

For example, in a video camera which is developed aiming at making it compact and light in weight, it is difficult to adopt, e.g. the conventional mechanical means as a stop mechanism for performing the adjustment of light quantity in taking a picture. Thus, it has been proposed to adopt an electrical dimmer device which uses, e.g. a liquid crystal as a light adjustment means instead of such a mechanical stop mechanism (see Patent Gazette of Laying-Open H11-326894).

Specifically, in the invention disclosed by the laid-open Patent Gazette, a polarizing plate is moved in and out of a light path where a liquid crystal cell is disposed to perform an initial light adjustment. Further, by controlling the potential impressed on the liquid crystal cell to make the polarized plane of the liquid crystal cell different from the polarized plane of the polarizing plate, more transmissive light quantity is attenuated. This makes it possible to perform satisfactory light adjustment with a simpler structure than the conventional mechanical stop mechanism.

However, with the above-mentioned structure, the liquid crystal cell always exists in the light path, so that the light transmissivity of the liquid crystal cell becomes a problem. Alternatively, it is conceived to provide a mechanism in which the liquid crystal cell is also moved in and out of the light path in same way as the polarizing plate. However, the arrangement of liquid crystal cell involves supply means (wiring) of a control voltage and the like, so that the mechanism for operating the whole system becomes complicated. This is opposed to the object of the apparatus, which makes it compact and light in weight.

Thus, the present applicant previously developed the liquid crystal cell whose light transmissivity is made extremely high and applied for patent on a light adjustment device which adopts this liquid crystal cell (Patent Application No. H11-322186). The invention of this earlier application uses a guest-host type liquid crystal for the liquid crystal and uses a negative type liquid crystal for its host material to make negative of the anisotropy of dielectric constant. The invention also uses a positive type or a negative type of dichromatic dye molecule for its guest material, thereby enabling the light transmissivity of 75% or more to be made, for example, when no control voltage is impressed.

However, such liquid crystal cell as just described above has heretofore had a slow response speed when the light transmissivity is changed, so that it is difficult to attain the response time, for example, equal to or less than one field period of time (e.g. 16.7 ms for the NTSC system of interlace scanning) which is required for the stop mechanism of video camera. To be specific, FIGS. 11A and 11B show response characteristics of the light transmissivity actually measured when the control voltage on the positive type liquid crystal is varied. FIG. 11A shows a state when the light transmissivity is raised. FIG. 11B shows a state when the light transmissivity is lowered.

In FIGS. 11A and 11B, the control voltage is a rectangular wave of one kHz, one cycle of which corresponds to one ms. Therefore it takes 22.5 ms for the light transmissivity to reach a target value in FIG. 11A, whereas it takes 9.9 ms to reach that value in FIG. 11B. It can be seen here that, when lowering the light transmissivity as in FIG. 11B, the response time of one field period of time or less can be attained, but when raising the light transmissivity as in FIG. 11A, it takes more time than one field period of time (e.g. 16.7 ms).

Moreover, the response speed of liquid crystal cell tends to sustain the influence of an environmental temperature. In other words, the response speed of liquid crystal cell becomes very slow particularly in low temperature (when the environmental temperature is 10° C. or under), for example, as seen in a table of FIG. 12A and a graph of FIG. 12B. On the other hand, it is assumed that the video camera and the like is used under the environmental temperature ranging from summer to winter. For example, when it is used outdoors in winter, the environmental temperature may become −10° C. or under depending on circumstances.

DISCLOSURE OF INVENTION

The object of the present invention is to provide an electrical dimmer device and its driving method which is capable of making the response speed when changing the light transmissivity very quick and realizing the response time, for example, equal to or less than one field period of time (e.g. 16.7 ms for the NTSC system of interlace scanning) which is required for the stop mechanism of video camera. For this purpose, when changing the light transmissivity of liquid crystal, the present invention varies once or temporarily the potential of an electric signal to a greater extent than a change width corresponding to the change in the light transmissivity, and then changes the potential to that one corresponding to a desired value. The electrical dimmer device and its driving method according to the present invention will be disclosed below in this connection.

BEST MODE FOR CARRYING OUT THE INVENTION

Figure 1:
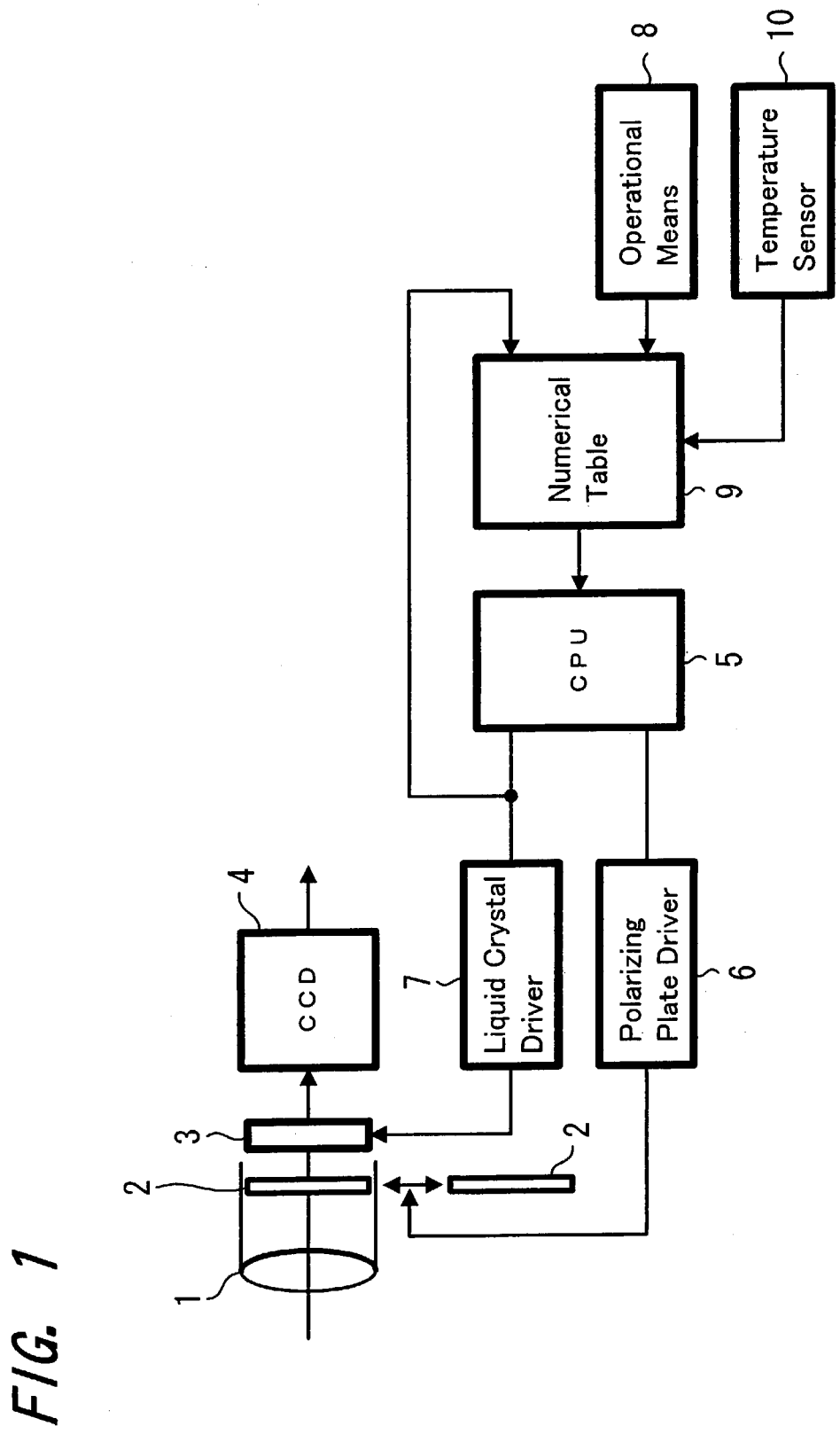
FIG. 1 is a block diagram showing the structure of main part of a video camera apparatus, as an embodiment to which the electrical dimmer device and its driving method according to the present invention is applied.

The present invention will be described below with reference to accompanying drawings. FIG. 1 is a block diagram showing the structure of main part of a video camera apparatus, as an embodiment to which an electrical dimmer device and its driving method according to the present invention is applied.

In FIG. 1, image light from a subject (not shown) is incident on a stop mechanism comprised of a polarizing plate 2 having a moving in/out mechanism, and a liquid crystal cell 3 through a lens 1. The image light passing the stop mechanism comprised of these polarizing plate 2 and liquid crystal cell 3 is applied to a semiconductor image pickup device (CCD) 4 and light quantity of the image light is converted into an electric signal. This electric signal will be converted into a predetermined image signal and processed for recording, transmission and the like. Since the processing and means therefore are well known in the art, they are not described herein.

In this apparatus, a microcomputer (CPU:hereinafter abbreviated to "micon") 5 for controlling operations of each part of the apparatus is provided. The micon 5 supplies a control signal to a polarizing plate driver circuit 6 to control the polarizing plate 2 to be moved in and out of the light path. The micon 5 also supplies a control signal to a liquid crystal driver circuit 7 to control the light transmissivity with respect to the liquid crystal cell 3.

Moreover, an operational means 8 to which a user's operation is inputted supplies an operation signal, e.g. for the stop adjustment to a numerical table 9. The present control signal for the stop adjustment supplied from the micon 5 to the liquid crystal driver circuit 7 is also supplied to the numerical table 9. Also, a temperature sensor 10 supplies a detected temperature signal to the numerical table 9. This makes it possible to derive a predetermined numerical value from the numerical table 9 based on the present value of control signal for the stop adjustment, a value of the operation signal for the stop adjustment issued from the user and the environmental temperature.

The numerical value derived from the numerical table 9 is supplied to the micon 5. On receiving this numerical value, the micon 5 operates to change the control signal for stop adjustment supplied to the liquid crystal driver circuit 7, from the present value for stop adjustment to the value for stop adjustment inputted by the user. During this operation, the micon 5 applies, as an intermediate control signal, an electric signal according to the value derived from the numerical table 9 for a time period according to the value derived from the numerical table 9. The thus modified control signal is supplied to the liquid crystal driver circuit 7 for controlling the liquid crystal cell 3.

Figure 2:
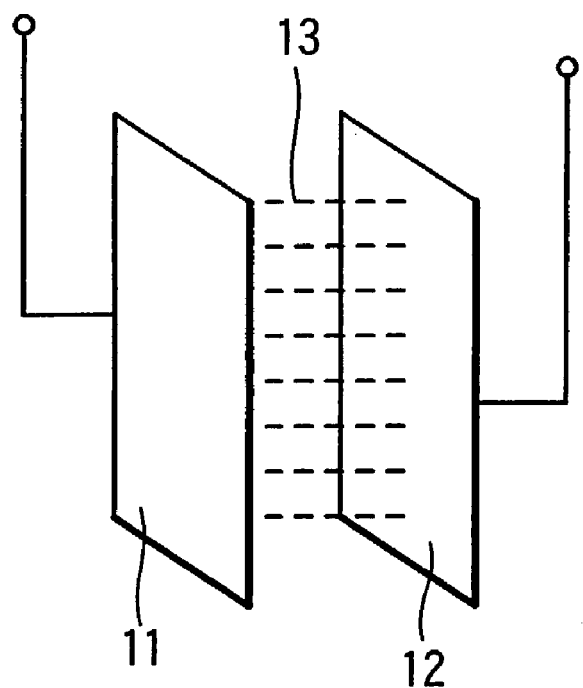
FIG. 2 is a structure diagram of the liquid crystal cell used in the stop adjustment mechanism.

On this occasion, the liquid crystal cell 3 is controlled by energy of an electric signal supplied thereto. Specifically, as shown in FIG. 2, the liquid crystal cell 3 used with the stop adjustment mechanism includes, for example, two transparent electrodes 11 and 12 between which liquid crystal material 13 is sealed in. On each of these transparent electrodes 11 and 12 an electric signal is applied to change the light transmissivity of the liquid crystal material 13 by energy of the electric signal.

As described above, the light transmissivity of liquid crystal material 13 in the liquid crystal cell 3 is controlled by the energy of supplied electric signal. The energy of electric signal depends, in turn, on the product of a control signal, or potential difference applied between the transparent electrodes 11 and 12, and a time period during which it is applied. Moreover, when DC component is impressed, the liquid crystal material 13 may be decomposed and deteriorated. Thus, it is necessary to supply the control signal so that no DC component may be produced between the transparent electrodes 11 and 12.

Figure 11A:
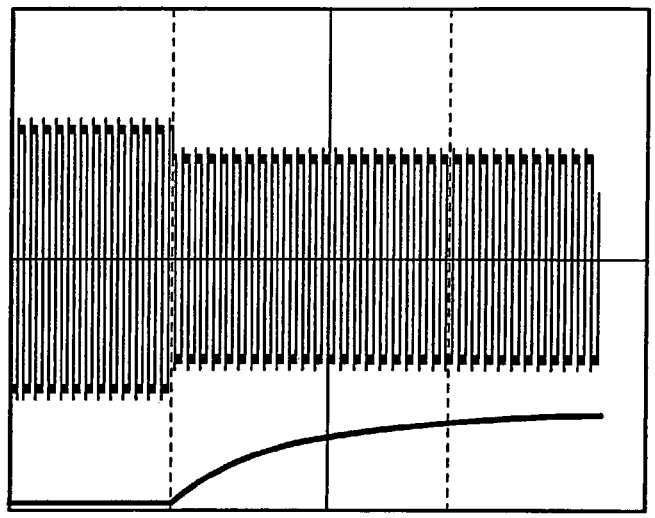
FIGS. 11A and 11B are diagrams for explaining a prior art.
Figure 11B:
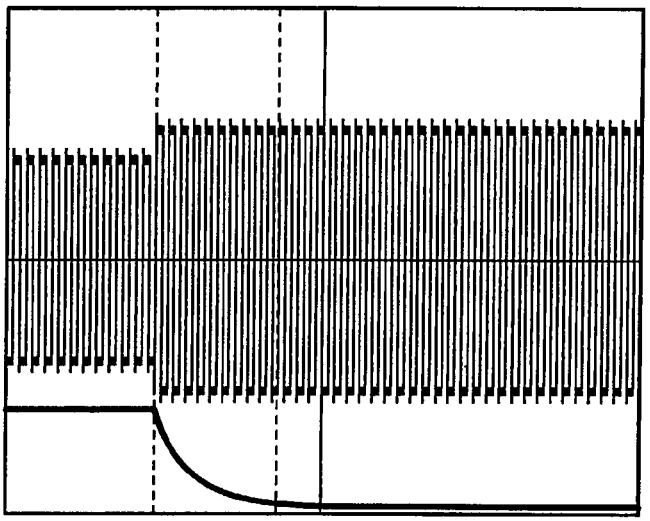
Figures 12A, 12B:
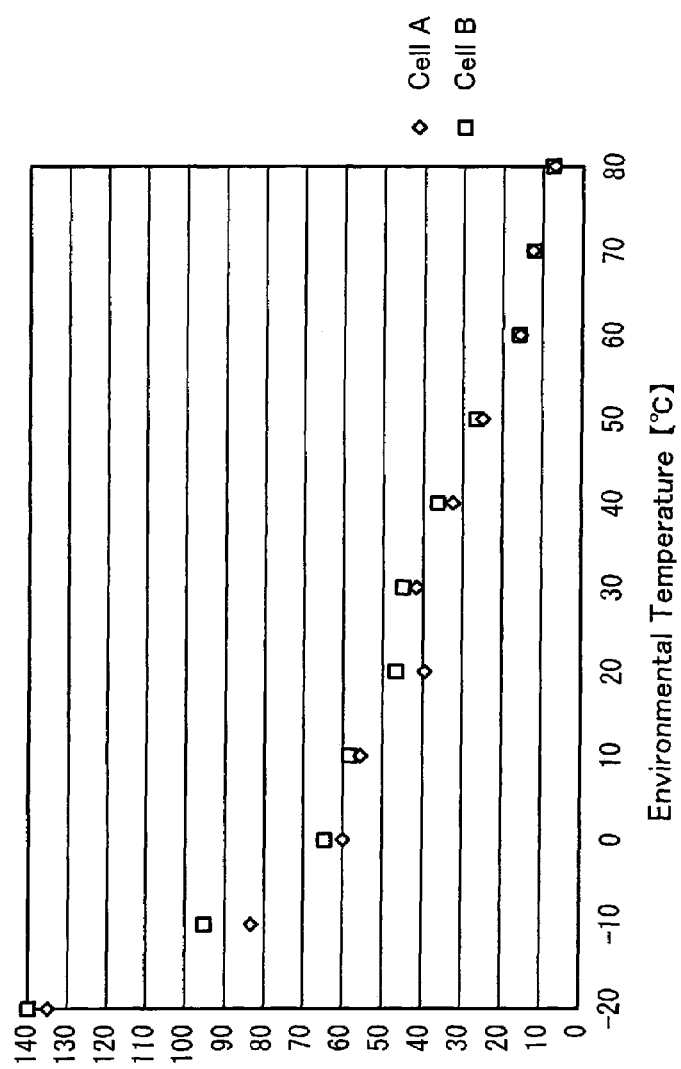
FIGS. 12A and 12B are diagrams for explaining a prior art.

To begin with, as a first mode for controlling energy of the electric signal, a manner of control by varying the potential difference as control signal applied between the transparent electrodes 11 and 12 as shown in FIG. 11 will be described below. In this case, electric signals which are each a rectangular wave having a duty factor of 50% and opposite in phase to each other are supplied to the respective transparent electrodes 11 and 12. The potential difference between the electrodes (amplitude) is controlled.

Figure 4:
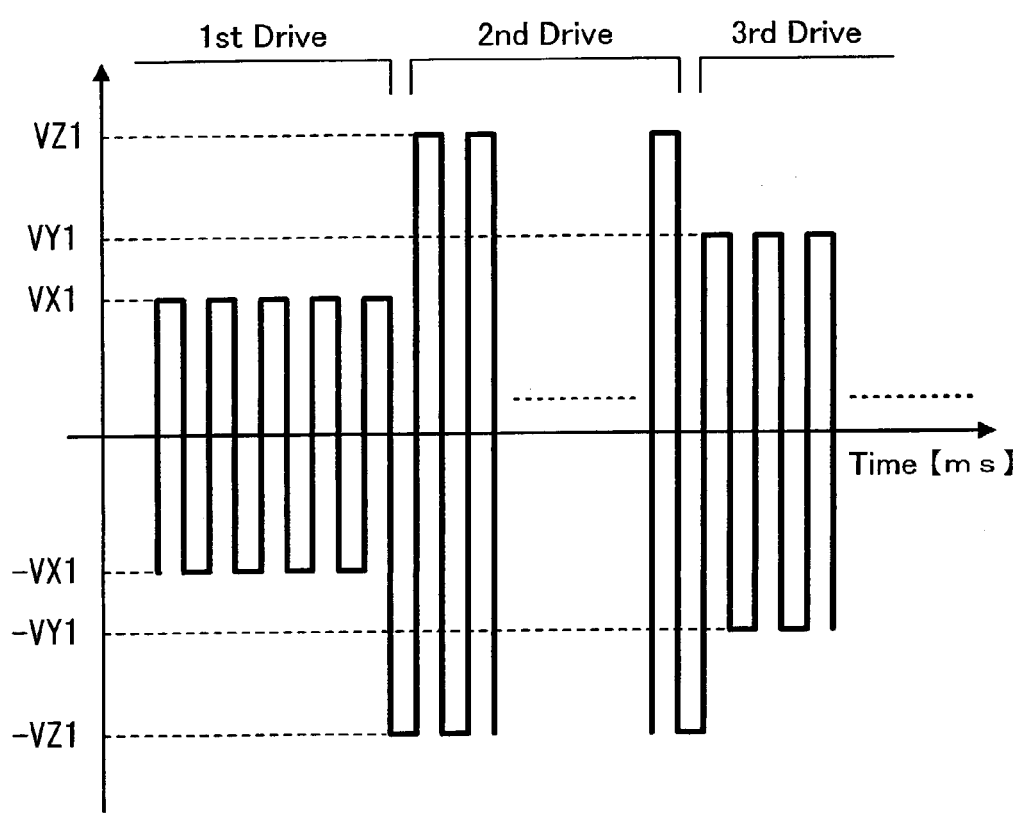
FIG. 4 is a signal wave form diagram for explaining its operation.

Specifically, in the first mode, for example as shown in FIG. 4, when the control signal for stop adjustment is varied from the present value of stop adjustment (±VX1) to a greater value (±VY1) (when the light transmissivity of a positive type of liquid crystal is raised or when the light transmissivity of a negative type of liquid crystal is lowered.), a time period during which there is applied a control signal of a still larger value (±VZ1) than the greater value (±VY1) is provided between the control signals of the present value and the greater value. The voltage and duration of the still larger value (±VZ1) are determined in accordance with values derived from the numerical table 9.

Figure 3:
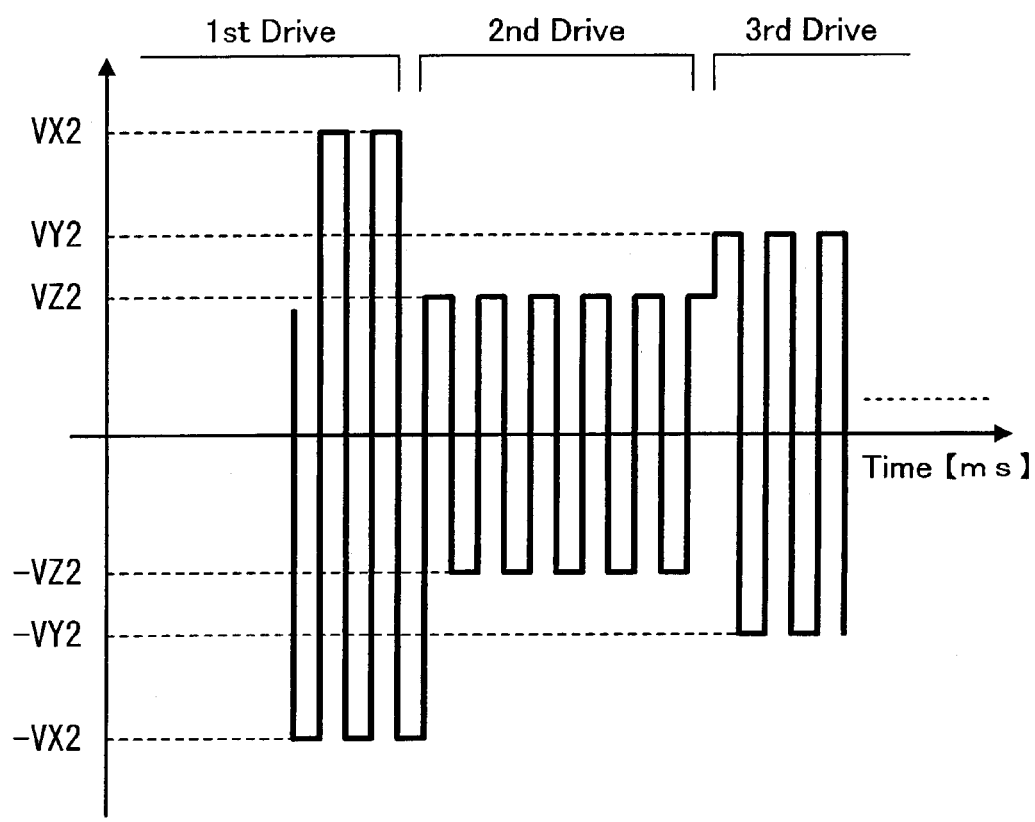
FIG. 3 is a signal wave form diagram for explaining its operation.

Alternatively, as shown in FIG. 3 for example, when the control signal for stop adjustment is varied from the present value of stop adjustment (±VX2) to a smaller value (±VY2) (when the light transmissivity of the positive type of liquid crystal is lowered or when the light transmissivity of the negative type of liquid crystal is raised.), a time period during which there is applied a control signal of a still smaller value (±VZ2) than the smaller value (±VY2) is provided between the control signals of the present value and the smaller value. The voltage and duration of the still smaller value (±VZ2) are determined in accordance with values derived from the numerical table 9.

Figure 5A:
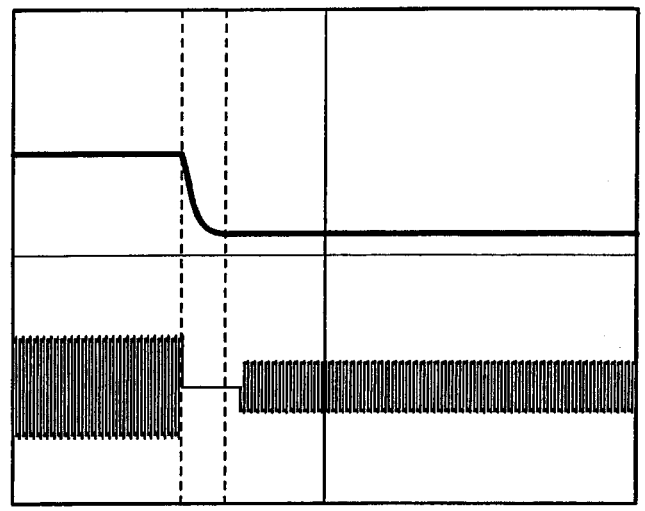
FIGS. 5A and 5B are diagrams for explaining their operations.
Figure 5B:
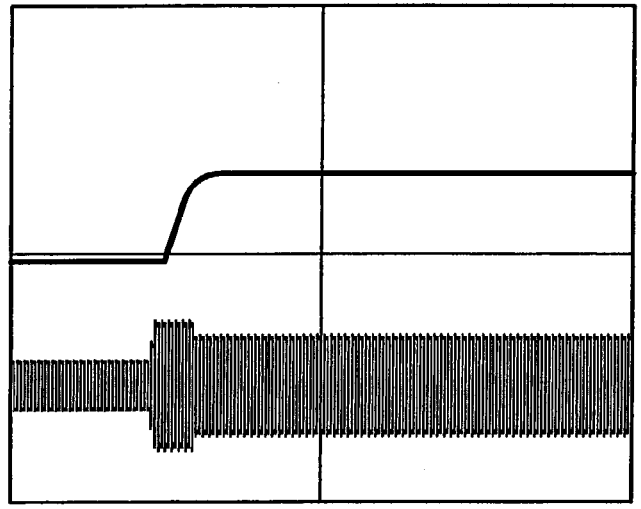

By impressing these control signals on the liquid crystal cell 3, the response speed when changing the light transmissivity can be made extremely faster. To be specific, FIGS. 5A and 5B show response characteristics of the light transmissivity actually measured when the control voltage on the negative type liquid crystal is thus varied. FIG. 5A shows a state when the light transmissivity is raised. FIG. 5B shows a state when the light transmissivity is lowered.

In these figures, the control voltage is a rectangular wave of one kHz and one cycle of the rectangular wave corresponds to one ms. Therefore, it can be seen that the light transmissivity reaches a target value in 6.5 ms from FIG. 5A and in about 9.9 ms from FIG. 5B. This shows that, in either case where the light transmissivity is raised or lowered, the light transmissivity of liquid crystal can be changed to a desired value in a time within one field period of time.

Accordingly, in this embodiment, when the light transmissivity of liquid crystal is changed, if the voltage of electric signal is once varied to a greater extent than a change width corresponding to the change of the light transmissivity and then varied to the voltage corresponding to a desired value, it is possible to make the response speed when changing the light transmissivity extremely faster.

Therefore, it is possible to realize the response time, for example, equal to or less than one field period of time (e.g. 16.7 ms for the NTSC system of interface scanning) which is required for the stop mechanism of video camera.

By doing in this way, although the conventional electrical dimmer device and its driving method could not attain the response time, for example, equal to or less than one field period of time required for the stop mechanism of video camera because the response speed when changing the light transmissivity is slow, the present invention can easily overcome this problem.

Referring again to FIG. 4, when the value of stop adjustment in the negative type liquid crystal is changed from, e.g. a value (±VX1=2.3V) corresponding to the light transmissivity of 40% to a value (±VY1=3.5V) corresponding to the light transmissivity of 16%, the response time will be 49.5 ms without the intermediate control voltage. In contrast, if the voltage of, e.g. a value (±VZ1=5.0V) is applied for 12.0 ms between both voltages of above values, the response time can be made 15.2 ms.

Also, in FIG. 4, when the value of stop adjustment in the negative type liquid crystal is changed from the value (±VX1=2.3V) corresponding to the light transmissivity of 40% to the value (±VY1=3.5V) corresponding to the light transmissivity of 16%, if the voltage of the value (±VZ1=5.0V) is applied for 13.0 ms, the response time can be made 13.2 ms. Further, if the voltage of a value (±VZ1=6.0V) is applied for 9.0 ms, the response time can be made 14.6 ms.

As described above, the response time can change variously depending on the voltage and time period during which it is applied when the control signal is varied. Thus, in response to specification such as the voltage which can be impressed on the liquid crystal and the response time which is required, necessary values therefore can be selected. These values of voltage and time period are registered in the numerical table 9. In this manner, by preparing the numerical tables 9 required for various uses, it is possible to apply the above described apparatus to those uses.

Moreover, the response time of liquid crystal is under the influence of the environmental temperature. To cope therewith, it is considered, for example, that the above-mentioned numerical table 9 is divided by the predetermined range of the environmental temperature into a plurality of tables, which are changed over according to the environmental temperature detected by the temperature sensor 10. By doing so, in the environment whose temperature ranges, e.g. from −20° C. to +50° C., it is always possible to drive the liquid crystal with the response time equal to or less than one field period of time (e.g. 16.7 ms). This enables a satisfactory stop mechanism using the liquid crystal to be implemented.

Figure 6A:
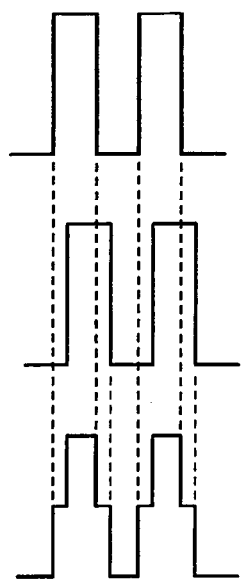
FIGS. 6A, 6B and 6C are wave form diagrams of a control signal for explaining a second embodiment according to the present invention.
Figure 6B:
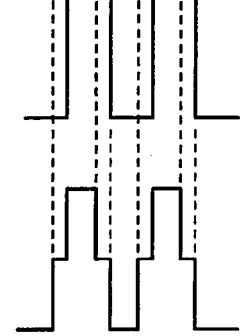
Figure 6C:
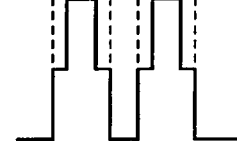

As a second mode for controlling energy of the electric signal, a manner of control by varying a pulse width of the control signal impressed between the transparent electrodes 11 and 12 will now be described below. In this second mode, as shown in FIGS. 6A and 6B for example, a rectangular wave having a duty factor of 50% is supplied to each of the transparent electrodes 11 and 12, and the phase of the control signal is varied as shown in FIG. 6C. As a result, the effective time period during which the control signal is applied between the transparent electrodes 11 and 12 is varied.

Figure 7A:
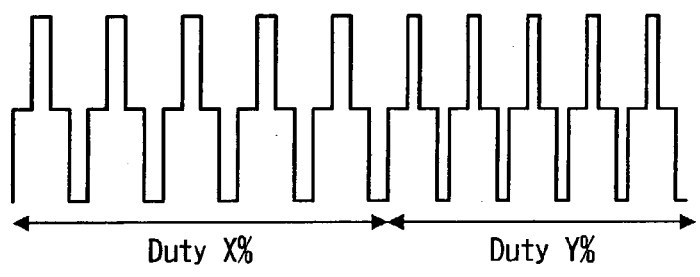
FIGS. 7A and 7B are wave form diagrams of conventional control signals corresponding to the second embodiment of the present invention.
Figure 7B:
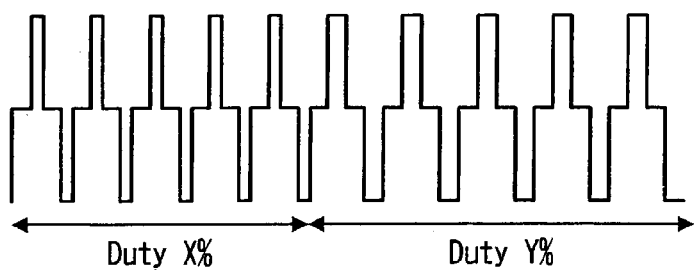

FIGS. 7A and 7B show wave forms of the control signals applied between the transparent electrodes 11 and 12 according to the conventional driving method. FIG. 7A shows the wave form when the control signal for stop adjustment is changed from the present value of stop adjustment to a smaller value (when the light transmissivity of the positive type liquid crystal is lowered or when the light transmissivity of the negative type liquid crystal is raised). FIG. 7B shows the wave from when the control signal for stop adjustment is changed from the present value for stop adjustment to a larger value (when the light transmissivity of the positive type liquid crystal is raised or when the light transmissivity of the negative type liquid crystal is lowered).

According to this conventional driving method, similarly to the case where the control is performed by changing the voltage of the control signal applied between the transparent electrodes 11 and 12, it always takes time equal to or more than one field period of time particularly when the light transmissivity is raised. To cope therewith, in the second mode according to the present invention, the energy of electric signal applied between the transparent electrodes 11 and 12 is once or temporarily varied to a greater extent than a change width corresponding to the change of the light transmissivity and then varied the energy to that one corresponding to a desired value.

Figure 8A:
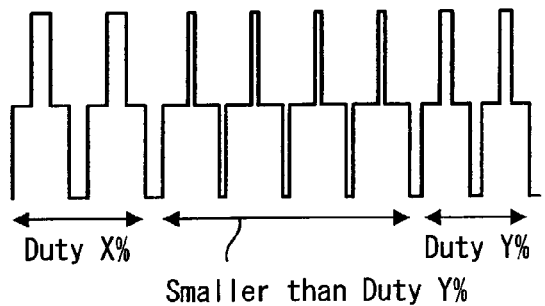
FIGS. 8A and 8B are wave form diagrams of control signals used in the second embodiment of the present invention.
Figure 8B:
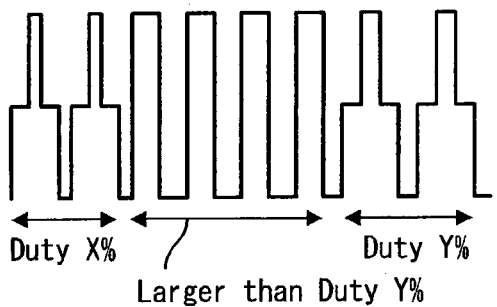

FIGS. 8A and 8B show wave forms of the control signals applied between the transparent electrodes 11 and 12 according to the driving method of the present invention. FIG. 8A shows the wave form when the control signal for stop adjustment is changed from the present value for stop adjustment to a smaller value (when the light transmissivity of the positive type liquid crystal is lowered or when the light transmissivity of the negative type liquid crystal is raised). FIG. 8B shows the wave form when the control signal for stop adjustment is changed from the present value for stop adjustment to a larger value (when the light transmissivity of the positive type liquid crystal is raised or when the light transmissivity of the negative type liquid crystal is lowered).

In the above driving method, as seen in FIG. 8A for example, when the control signal for stop adjustment is changed in the duty factor from its present value X % to a smaller value Y %, a control signal having a duty factor of Z % that is still smaller than the target duty factor of Y % is interposed for a certain time period between the control signals of the duty factors of X % and Y %. Note that the value Z % of duty factor and the time period in which the intermeadiate control signal is interposed are determined based on values derived from the numerical table 9.

Also, as is seen in FIG. 8B for example, when the control signal for stop adjustment is changed in the duty factor from the present value X'% to a larger value Y'%, a control signal having a duty factor of Z'% that is still larger than the target duty factor of Y'% is interposed for a certain time period between the control signals of the duty factors of X'% and Y'%. Note that the value Z'% of duty factor and the time period in which the intermediate control signal is interposed are determined based on values derived from the numerical table 9.

Figure 9:
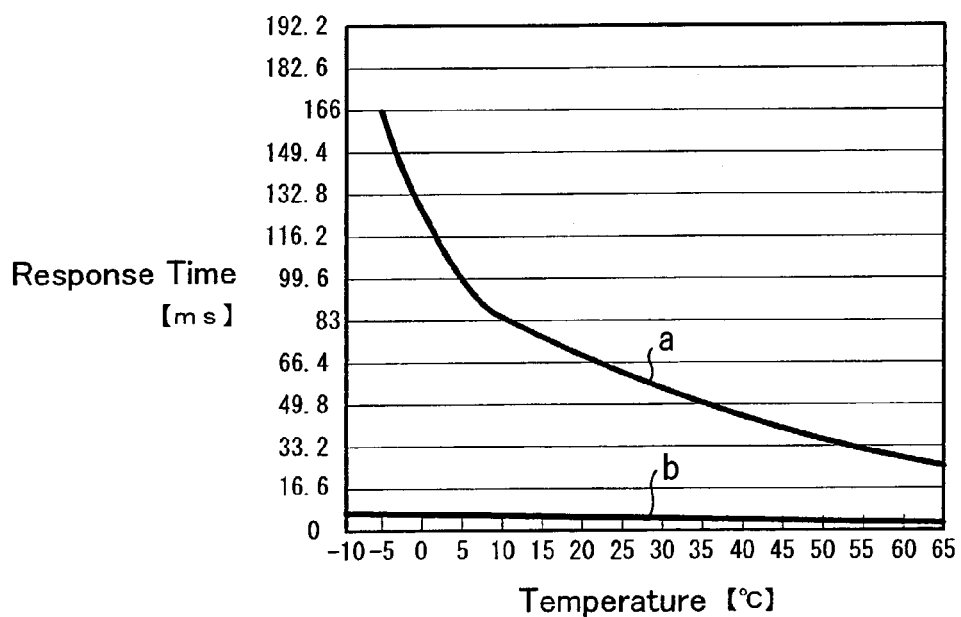
FIG. 9 is a graph for explaining their operations.

By impressing such control signals on the liquid crystal cell 3, the response speed when changing the light transmissivity can be made very fast. FIG. 9 shows a characteristic of the response time to the temperature. In the figure, a curve a shows the characteristic obtained using the conventional driving method shown in FIG. 7, and a curve b shows the characteristic obtained using the driving method according to the present invention shown in FIG. 8. As can clearly be seen from FIG. 9, according to the present invention, it is possible to drive the liquid crystal with the response time equal to or less than one field period of time (e.g. 16.7 ms) in the whole range of ordinary use conditions. Thus, a satisfactory stop mechanism using the liquid crystal can be materialized.

Therefore, in this embodiment, by varying once the pulse width of the electric signal more greatly than a change width corresponding to the change of light transmissivity when changing the light transmissivity of liquid crystal, and then varying the pulse width to that one corresponding to the desired value, the response speed when changing the light transmissivity can be made very quick. Accordingly, it is possible to realize the response time, for example, equal to or less than one field period of time (e.g. 16.7 ms for the NTSC system of interlace scanning) which is required for the stop mechanism of video camera.

This enables the present invention to easily solve the problem in which, according to the conventional electrical dimmer device and its driving method, the response speed when changing the light transmissivity of liquid crystal is very slow, so that the response time of, e.g. one field period of time or less required for the stop mechanism of video camera could not be realized.

In addition, the negative type host materials whose dielectric constant anisotropy (Δε) is negative and which are available for the electrical dimmer device and its driving method according to the present invention are exemplified as follows. However, in the actual use, compounds in which what are selected among the following compounds are blended are employed so as to exhibit the nematic nature in the range of actual use temperature.

<Exemplified Compounds>

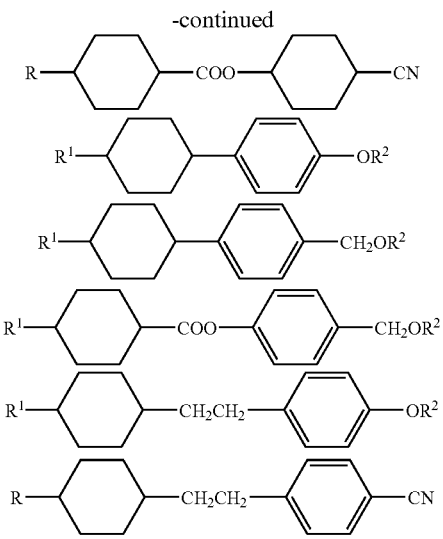

| molecular structure | Δε | C | N | I |
|---|---|---|---|---|
| C$_5$H$_{11}$–⬡–⬡–COO–⬡(CN)–C$_7$H$_{15}$ | −4.0 | −45 | −101 | — |
| C$_3$H$_7$–⬡–⬡–COO–⬡(CN)–C$_4$H$_9$ | −4.2 | −56 | −113 | — |
| C$_4$H$_9$–⬡–COO–⬡(CN,CN)–O–C$_4$H$_9$ | −22 | −85.8 | SA (−52.0) | — |
| C$_5$H$_{11}$–⬡–⬡–COO–⬡(CN,CN)–O–C$_5$H$_{11}$ | −18 | −133.5 | −143.5 | — |
| C$_5$H$_{11}$–⬡(CN)–⬡(C$_5$H$_{11}$) branched | −8 | −24 | 66 | — |

<Other Fundamental Structures>

The following R, R$^1$, R$^2$, L show linear or branching alkyl, alkoxy, alkenyl, fluoroalkoxy, fluoroalkenyl, —CN, and the like.

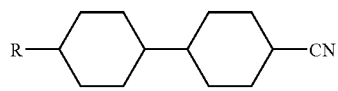

-continued

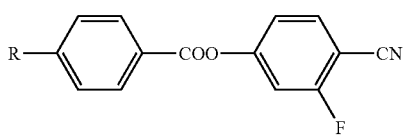

-continued
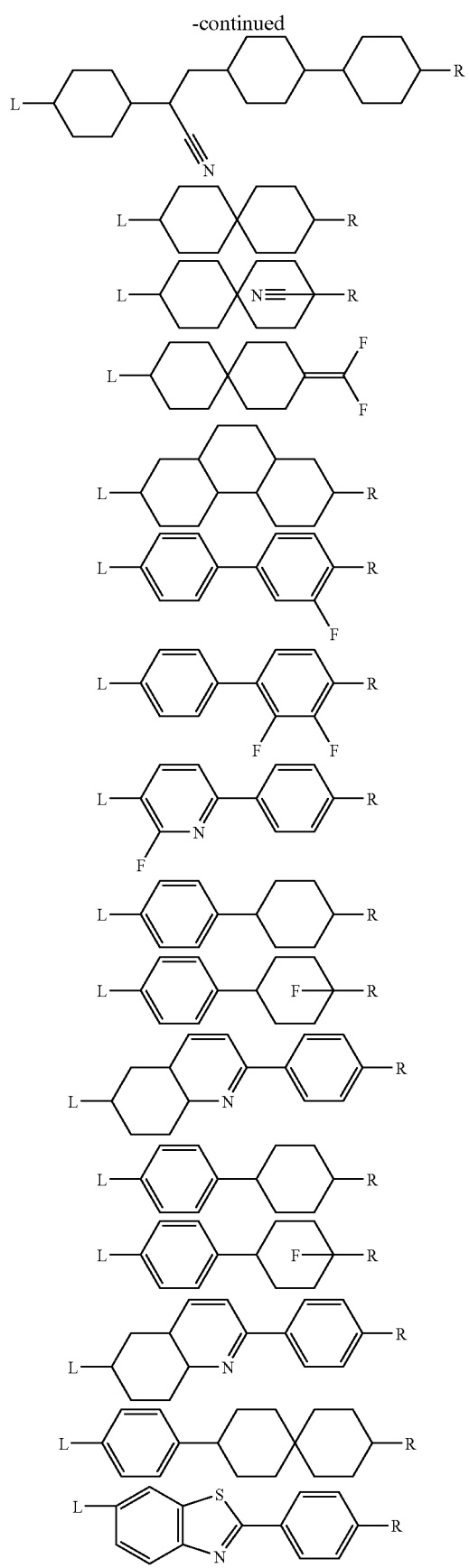
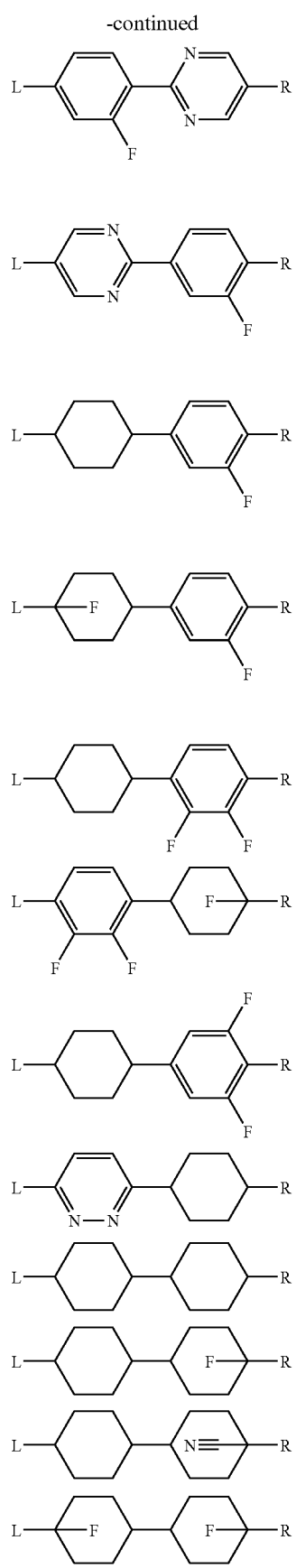

-continued
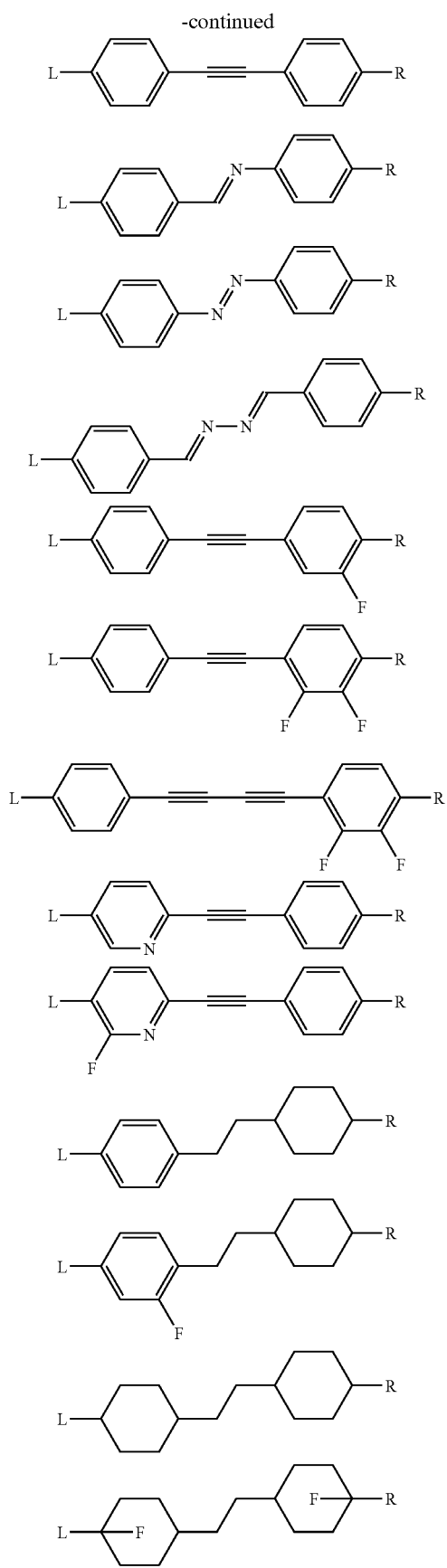
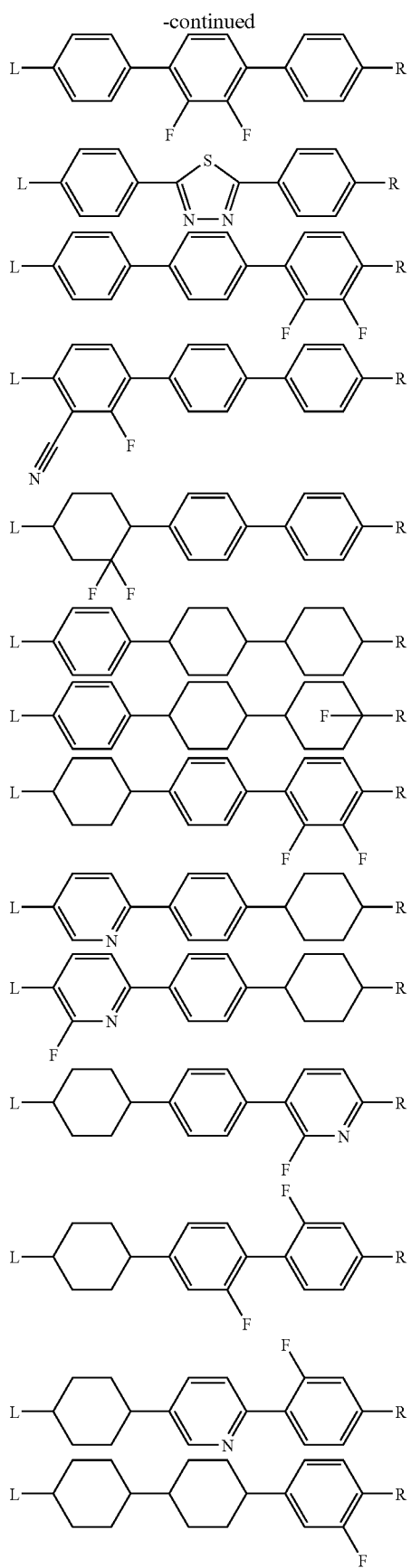

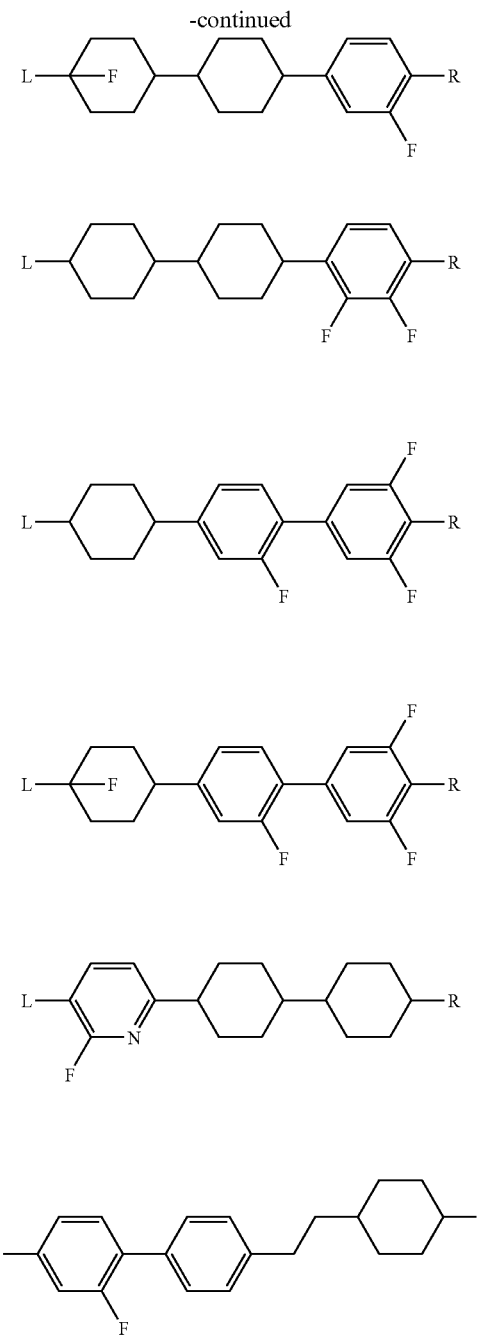

<Examples by Trade Name>

① MLC-6608
(made by Merck Co.):

| | | |
|---|---|---|
| S-N transition | | <−30.0° C. |
| clarifying temperature | | +90.0° C. |
| rotation viscosity υ1 | 20° C. | 186.0 mPa · s |
| optical anisotropy | $\Delta n$ | 0.0830 |
| +20° C., 589.3 nm | $n_e$ | 1.5586 |
| | $n_o$ | 1.5586 |
| dielectric constant anisotropy | $\Delta \epsilon$ | −4.2 |
| +20° C., 1.0 kHz | $\epsilon \perp$ | 7.8 |
| | $\epsilon ''$ | |
| elastic constant | K11 | 16.7 pN |
| +20° C. | K33 | 18.1 pN |
| | K33/K11 | 1.08 |
| low temperature stability | −30° C. | 1000 h cr |

② MLC-2039
(made by Merck Co.):

| | | |
|---|---|---|
| clarifying temperature | | +91.0° C. |
| rotation viscosity υ1 | 20° C. | 163.0 mPa · s |
| optical anisotropy | $\Delta n$ | 0.0821 |
| +20° C., 589.3 nm | $n_e$ | 1.5575 |
| | $n_o$ | 1.4754 |
| dielectric constant anisotropy | $\Delta \epsilon$ | "4.1 |
| +20° C., 1.0 kHz | $\epsilon \perp$ | 7.6 |
| | $\epsilon ''$ | 3.5 |

③ MLC-2038
(made by Merck Co.):

| | | |
|---|---|---|
| clarifying temperature | | +80.0° C. |
| flow viscosity υ | 20° C. | 29 mm² s⁻¹ |
| | 0° C. | 128 mm² s⁻¹ |
| +20° C., 589.3 nm | −20° C. | 1152 mm² s⁻¹ |
| | −30° C. | 6369 mm² s⁻¹ |
| rotation viscosity υ1 | 20° C. | 179.0 mPa · s |
| optical anisotropy | $\Delta n$ | 0.1032 |
| +20° C., 589.3 nm | $n_e$ | 1.5848 |
| | $n_o$ | 1.4816 |
| dielectric constant anisotropy | $\Delta e$ | −5.0 |
| +20° C., 1.0 kHz | $\epsilon \perp$ | 9.0 |
| | $\epsilon ''$ | 4.0 |
| elastic constant | K11 | 13.8 pN |
| +20° C. | K33 | 18.1 pN |
| | K33/K11 | 1.31 |
| low temperature | −30° C. | 48 h cr |
| stability | −30° C. | 432 h cr |

④ MLC-2037
(made by Merck Co.):

| | | |
|---|---|---|
| S-N transition | | <−20.0° C. |
| clarifying temperature | | +71.0° C. |
| rotation viscosity υ1 | 20° C. | 132.0 mPa · s |
| optical anisotropy | $\Delta n$ | 0.0649 |
| +20° C., 589.3 nm | $n_e$ | 1.5371 |
| | $n_o$ | 1.4722 |
| dielectric constant anisotropy | $\Delta \epsilon$ | −3.1 |
| +20° C., 1.0 kHz | $\epsilon \perp$ | 6.7 |
| | $\epsilon ''$ | 3.6 |
| low temperature stability | −20° C. | 1000 h cr |

Moreover, the dichromatic dye molecule available for the electrical dimmer device and its driving method based on the present invention can be exemplified as follows.

| molecular structure | δm (nm) | color | dichromatic ratio |
|---|---|---|---|
| D5 | 590 | blue | 5.3 |
| D35 | 553 | purple | 6.5 |
| L-dye B | 641 | blue | 9.2 |
| G209 | 687 | blue | 9.5 |

-continued

| | molecular structure | δm (nm) | color | dichromatic ratio |
|---|---|---|---|---|
| G168 | benzothiazole-N=N-C6H4-N(C2H5)2 | 574 | blue | 10.6 |
| G164 | C4H5O2S-benzothiazole-N=N-C6H4-N(C2H5)2 | 595 | blue | 10.3 |
| G224 | C6H7O2S-C6H4-N=N-naphthyl-N=N-C6H4-pyrrolidine | 574 | violet | 9.7 |
| G205 | C4H9-C6H4-N=N-C6H4-pyrrolidine | 507 | red | 11.4 |
| G232 | C4H5O-C6H4-CH=N-naphthyl-N=N-C6H4-CH=N-C6H4-OC4H9 | 450 | yellow | 12.1 |

D5, D35: made by BDH Co., L-dye B: made by Roche Co.,
Others: made by Nihon Kanko Shikiso Kendyusho

| pigment structure | δmax (nm) (in liquid crystal) | S (value at δmax) |
|---|---|---|
| H₉C₄O—⟨⟩—CH=N—⟨⟩—N=N—⟨naphthalene⟩—N=CH—⟨⟩—OC₄H₉ | 450 | 0.79 |
| H₉C₄—⟨⟩—N=N—⟨naphthalene⟩—N=N—⟨⟩—OCH₃ ⟨⟩—OC₅H₁₁ | 440 | 0.78 |
| H₉C₄—⟨⟩—N=N—⟨naphthalene⟩—N=N—⟨⟩—N(pyrrolidine) | 542 | 0.75 |
| H₁₁C₈—⟨⟩—OCO—⟨⟩—N=N—⟨naphthalene⟩—N=N—⟨⟩—N(CH₃)₂ | 548 | 0.78 |
| H₉C₄—⟨⟩—N=N—⟨⟩—N=N—⟨naphthalene⟩—N=N—⟨⟩—N(C₂H₅)₂ | 573 | 0.77 |
| H₉C₄—⟨⟩—CH₂NH—⟨naphthalene⟩—N=N—⟨⟩—N=N—⟨naphthalene⟩—N=N—⟨naphthalene⟩—NHCH₂—⟨⟩—C₄H₉ | 610 | 0.83 |
| anthraquinone with S—⟨⟩—C(CH₃)₃ and S—⟨phenyl⟩ substituents | 464 | 0.80 |

-continued
| pigment structure | δmax (nm) (in liquid crystal) | S (value at δmax) |
|---|---|---|
| 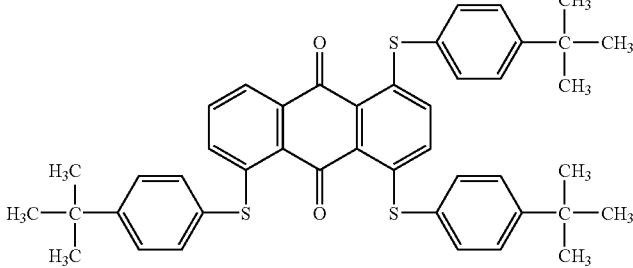 | 520 | 0.77 |
| 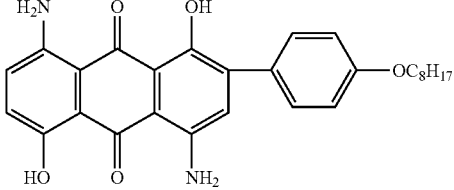 | — | 0.76 |
| 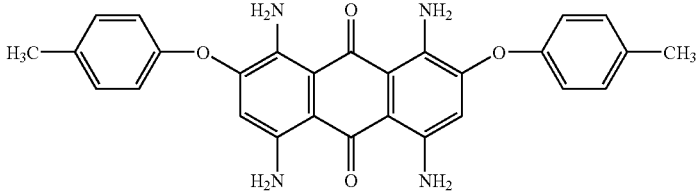 | 638 | 0.78 |
| 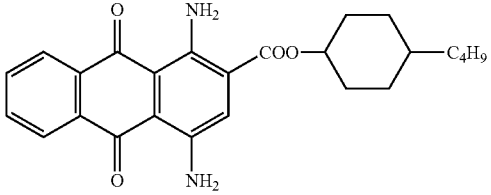 | 638 | 0.77 |
| 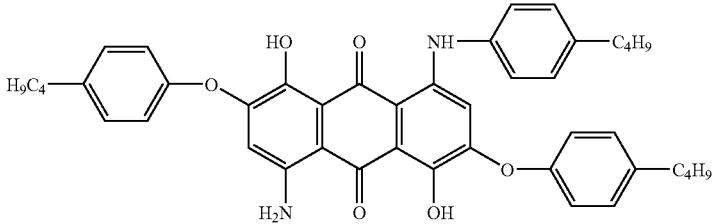 | 627 | 0.76 |
| 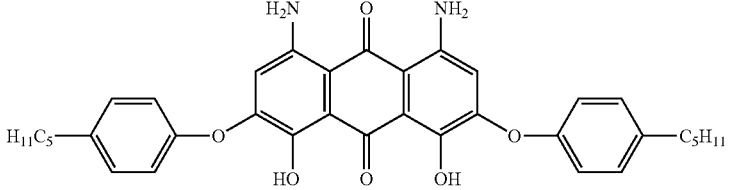 | 640 | 0.77 |

-continued

| pigment structure | δmax (nm) (in liquid crystal) | S (value at δmax) |
|---|---|---|
| 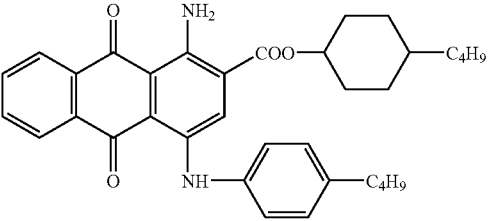 | 668 | 0.74 |
| 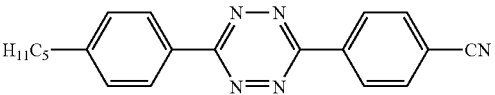 | 565 | −0.377 |
| 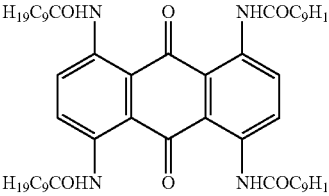 | 548 | −0.33 |

As described above, the electrical dimmer device according to the present invention comprises the driving means in which, when changing the light transmissivity from its current value to a desired value in the electrical dimmer device including the liquid crystal whose light transmissivity is controlled by the energy of supplied electric signal, the energy of electric signal is once varied to a greater extent than a change width corresponding to the change of light transmissivity and thereafter is varied to energy corresponding to the desired value of light transmissivity. Thus, according to the electrical dimmer device of the present invention, it is possible to make the response speed when changing the light transmissivity of liquid crystal extremely fast and to realize the response time of, e.g. one field period of time or less required for the stop mechanism of video camera.

As described above, the driving method of electrical dimmer device according to the present invention comprises the step in which, when changing the light transmissivity from its current value to a desired value in the electrical dimmer device including the liquid crystal whose light transmissivity is controlled by the energy of supplied electric signal, the energy of electric signal is once varied to a greater extent than a change extent corresponding to the change in light transmissivity and is then varied to energy corresponding to the desired value of light transmissivity. Thus, according to the driving method of the present invention, it is possible to make the response speed when changing the light transmissivity of liquid crystal extremely fast and to attain the response time of, e.g. one field period of time or less required for the stop mechanism of video camera.

Furthermore, in the above-mentioned embodiment, although the method for giving the energy change of electric signal has been described separately by dividing it into two methods, namely, the method by varying the voltage of control signal and the method by varying the pulse width of control signal, these methods can be executed together so as to control the light transmissivity more quickly. Specific means for this purpose can be realized, for example, by increasing or decreasing the voltage in the intermediate time period so as to change the energy in the above driving method shown in FIGS. 8A and 8B. This can be done, further, by varying the pulse height (the voltage) shown in FIGS. 6A and 6B.

By doing in this way, it will be possible to adopt the electrical dimmer device according to the present invention instead of the conventional mechanical shutter in the following exemplified cases: when intense light such as the sunlight is incident by mistake, the light transmissivity is lowered immediately by detecting it for preventing the image pickup device from being broken; or when taking a still picture, incident light is cut off beforehand for discharging accumulated electric charges.

Although the above embodiment has been described taking the stop mechanism of image pickup unit as an example, the present invention is not limited thereto and can be carried out, for example, as a shutter mechanism of DSC (Digital Still Camera) or as a liquid crystal display unit. Specifically, when the electrical dimmer device according to the present invention is applied to the liquid crystal display unit, it is possible to carry out by miniaturize the above-mentioned device and arranging them, for example, in the matrix manner. On this occasion, it is important that, as described above, a large contrast ratio can be obtained and also the response time of one field period of time or less can be attained.

Figure 10A:
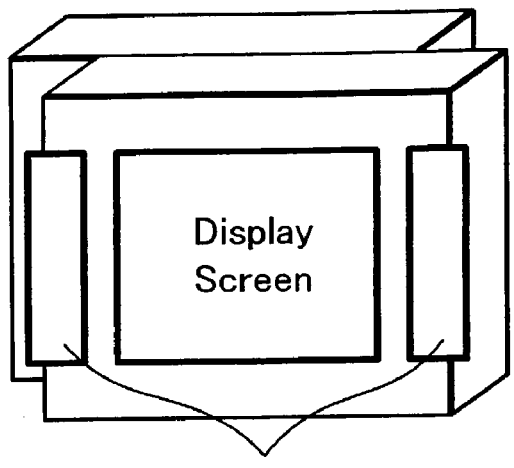
FIGS. 10A and 10B are structure diagrams of embodiments of display units to which an electrical dimmer device and its driving method according to the present invention is applied.
Figure 10B:
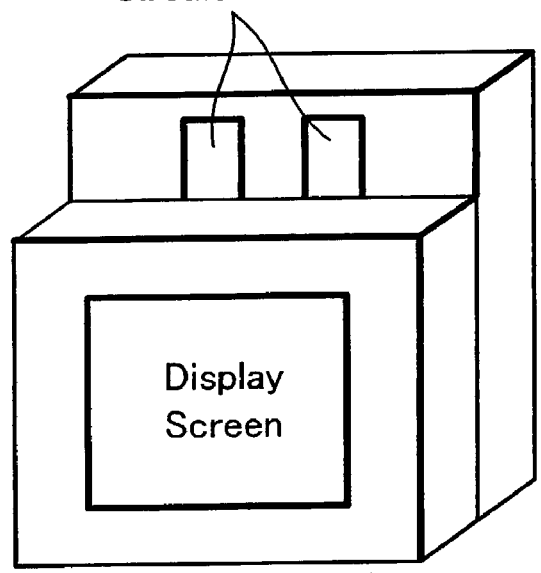

When the transparent electrodes are employed, such liquid crystal display unit can be carried out, for example, as a transmission type projector. But, it can also be carried out as a reflection type liquid crystal display unit. The transmission type liquid crystal display unit must have circuit portions around the display screen, for example, as shown in FIG. 10A. When carrying out as the reflection type liquid crystal display unit, it is possible to arrange the circuit portions behind the display screen for making an effective area of the display screen larger, for example, as shown in FIG. 10B.

Furthermore, there has been described the case where an image signal of the NTSC system is chiefly used. This is because that the image signal of NTSC system by interlace scanning has one field period of time which is the shortest among the generally used image signals. For example, in case of PAL or SECAM system or the progressive scanning, one field period of time is longer than this and so they can make use of the above described embodiments. Moreover, the present invention can also be applied to the other systems whose signals have one field period of time that is shorter than that.

As described above, according to the electrical dimmer device of the present invention, it is possible to make the response speed extremely fast when changing the light transmissivity of liquid crystal and realize the response time of, e.g. one field period of time or less required for the stop mechanism of video camera, by varying once the energy of electric signal to a larger extent than a change width corresponding to the change of light transmissivity and then varying the energy to that corresponding to a desired value.

Moreover, according to the present invention, it is possible to perform satisfactory light adjustment at a fast response speed by varying the voltage of control signal arbitrarily based on a fact that the change of energy of electric signal can be given by a change of the voltage of the control signal.

According to the present invention, it is possible to perform satisfactory light adjustment at a quick response speed by determining the extent to which the voltage is once varied and the time period during which that varied voltage is applied depending on voltages before and after the varying.

Furthermore, according to the present invention, it is possible to perform satisfactory light adjustment at a fast response speed and with simple structure by determining the extent to which the voltage is once varied and the time period during which that varied voltage is applied using the table containing values of the voltages before and after varying the voltage as reference values.

Moreover, according to the present invention, it is possible to perform satisfactory light adjustment even if the surrounding temperature changes by measuring the surrounding temperature and changing over the tables depending on the measured surrounding temperature, which contains the voltage values before and after varying the voltage as reference values, for determining the extent to which the voltage is once varied and the time period during which that varied voltage is applied.

According to the present invention, it is possible to perform satisfactory light adjustment for decreasing a penetrating light quantity by determining the extent to which the voltage is once varied and the time period during which that varied voltage is applied so that the response time when lowering the light transmissivity from its current value may be equal to or less than one field period of time.

Also, according to the present invention, it is possible to perform satisfactory light adjustment for increasing the penetrating light quantity by determining the extent to which the voltage is once varied and the time period during which that varied voltage is applied so that the response time when raising the light transmissivity from its current value may be equal to or less than one field period of time.

According to the present invention, it is possible to perform satisfactory light adjustment at a quick response speed by varying a pulse width of the control signal arbitrarily based on a fact that the change of energy of electric signal can be given by a change of the pulse width of the control signal.

According to the present invention, it is possible to perform satisfactory light adjustment at a quick response speed by determining a value of the pulse width to which it is once varied and the time period during which that varied pulse width is interposed, depending on values of the pulse widths before and after varying the pulse width.

Furthermore, according to the present invention, it is possible to perform satisfactory light adjustment at a fast response speed and with simple structure by determining the pulse width value to which the pulse width is once varied and the time period during which that varied pulse width is interposed, using the table containing values of the pulse widths before and after varying the pulse width as reference values.

According to the present invention, it is possible to perform satisfactory light adjustment even if the surrounding temperature changes by measuring the surrounding temperature and changing over the tables depending on the measured surrounding temperature, which contain the pulse width values before and after varying the pulse width as reference values, for determining the pulse width value to which the pulse width is once varied and the time period during which that varied pulse width is interposed.

Moreover, according to the present invention, it is possible to perform satisfactory light adjustment for decreasing the penetrating light quantity by determining the pulse width value to which the pulse width is once varied and the time period during which that varied pulse width is interposed so that the response time when lowering the light transmissivity from its current value may be equal to or less than one field period of time.

According to the present invention, it is possible to perform satisfactory light adjustment for increasing the penetrating light quantity by determining the pulse width value to which the pulse width is once varied and the time period during which that varied pulse width is interposed so that the response time when raising the light transmissivity from its current value may be equal to or less than one field period of time.

According to the present invention, it is possible to perform satisfactory light adjustment by employing, as the liquid crystal, the guest-host type liquid crystal containing dichromatic dye molecules for making the maximum penetrating light quantity larger.

Furthermore, according to the present invention, it is possible to make the response speed when changing the light transmissivity of liquid crystal extremely fast by varying once the energy of electric signal to a larger extent than a change width corresponding to the change of light transmissivity and thereafter varying the energy to that corresponding to the desired value. Therefore, it is possible to realize the response time of, e.g. one field period of time or less required for the stop mechanism of video camera.

Moreover, according to the present invention, it is possible to perform satisfactory light adjustment at a quick response speed by varying the voltage of a control signal arbitrarily based on a fact that the change of energy of electric signal can be given by a change of the voltage of the control signal.

According to the present invention, it is possible to perform satisfactory light adjustment at a quick response speed by determining the extent to which the voltage is once varied and the time period during which that varied voltage is applied depending on the voltage values before and after varying the voltage.

Furthermore, according to the present invention, it is possible to perform satisfactory light adjustment at a quick response speed and with simple structure by determining the extent to which the voltage is once varied and the time period during which that varied voltage is applied using the table containing the voltage values before and after varying the voltage as reference values.

Moreover, according to the present invention, it is possible to perform satisfactory light adjustment even if the environmental temperature changes by measuring the environmental temperature and changing over the tables depending on the measured environmental temperature, which contain the voltage values before and after varying the voltage as reference values for determining the extent to which the voltage is once varied and the time period during which that varied voltage is applied.

According to the present invention, it is possible to perform satisfactory light adjustment for decreasing the penetrating light quantity by determining the extent to which the voltage is once varied and the time period during which that varied voltage is applied so that the response time when lowering the light transmissivity from its current value may be equal to or less than one field period of time.

According to the present invention, it is possible to perform satisfactory light adjustment for increasing the penetrating light quantity by determining the extent to which the voltage is once varied and the time period during which that varied voltage is applied so that the response time when raising the light transmissivity from its current value may be equal to or less than one field period of time.

According to the present invention, it is possible to perform satisfactory light adjustment at a quick response speed by varying the pulse width of a control signal arbitrarily based on a fast that the change of energy of electric signal can be given by a change of the pulse width of the control signal.

According to the present invention, it is possible to perform satisfactory light adjustment at a quick response speed by determining the pulse width value to which the pulse width is once varied and the time period during which that varied pulse width is interposed depending on the pulse width values before and after varying the pulse width.

According to the present invention, it is possible to perform satisfactory light adjustment at a quick response speed and with simple structure by determining the pulse width value to which the pulse width is once varied and the time period during which that varied pulse width is interposed using the table containing values of the pulse widths before and after varying the pulse width as reference values.

Moreover, according to the present invention, it is possible to perform satisfactory light adjustment even if the environmental temperature changes by measuring the environmental temperature and changing over the tables depending on the measured environmental temperature, which contain values of the pulse widths before and after varying the pulse width as reference values for determining the pulse width value to which the pulse width is once varied and the time period during which that varied pulse width is interposed.

According to the present invention, it is possible to perform satisfactory light adjustment for decreasing the penetrating light quantity by determining the pulse width value to which the pulse width is once varied and the time period during which that varied pulse width is interposed so that the response time when lowering the light transmissivity from its current value may be equal to or less than one field period of time.

Also, according to the present invention, it is possible to perform satisfactory light adjustment for increasing the penetrating light quantity by determining the pulse width value to which the pulse width is once varied and the time period during which that varied pulse width is interposed so that the response time when raising the light transmissivity from its current value may be equal to or less than one field period of time.

According to the present invention, it is possible to perform satisfactory light adjustment by employing, as the liquid crystal, the guest-host type liquid crystal containing dichromatic dye molecules for making the maximum penetrating light quantity larger.

As described above, the present invention can easily overcome the problem in which the conventional electrical dimmer device and its driving method could not attain the response time of, e.g. one field period of time or less (e.g. 16.7 ms for the NTSC system of interlace scanning) required for the stop mechanism of video camera because of a slow response speed when changing the light transmissivity of liquid crystal.

DESCRIPTION OF REFERENCE NUMERALS

1 . . . Lens
2 . . . Polarizing Plate
3 . . . Liquid Crystal Cell
4 . . . Semiconductor Image Pickup Device (CCD)
5 . . . Microcomputer (Micon)
6 . . . Polarizing Plate Driver Circuit
7 . . . Liquid Crystal Driver Circuit
8 . . . Operational Means
9 . . . Numerical Table
10 . . . Temperature Sensor
11, 12 . . . Transparent Electrode—
13 . . . Liquid Crystal Material

The invention claimed is:

1. An electrical dimmer device including a liquid crystal whose light transmissivity is controlled by an energy of an electric signal supplied thereto, the device comprising
    driving means for varying the energy of the electric signal that controls the light transmissivity of the liquid crystald, and
    operation signal receiving means for receiving an operation signal for a stop adjustment,
    wherein, when the operation signal for a stop adjustment is received, the driving means varies the energy of the electric signal according to a current value and a received value of the operation signal for the stop adjustment, and
    wherein, when the light transmissivity is changed from its current value to a desired value, the driving means varies the energy of the electric signal to a greater extent than a change width corresponding to the change of the light transmissivity for a predetermined time before varying the energy to that corresponding to the desired value of the light transmissivity.

2. The electrical dimmer device according to claim 1, wherein said driving means varies the energy of the electric signal by changing the voltage of a control signal.

3. The electrical dimmer device according to claim 2, further comprising means for determining a level of the voltage to which the voltage is varied once and the predetermined time during which the varied voltage is applied depending on values of respective voltages before varying the voltage and after varying the voltage.

4. The electrical dimmer device according to claim 3, wherein the level of the voltage to which the voltage is varied once and the predetermined time during which the varied voltage is applied are determined using a table that contains respective voltage values before varying the voltage and after varying the voltage as reference values.

5. The electrical dimmer device according to claim 4, further comprising means for measuring an environmental temperature and changing over the value in the table depending on a measured environment temperature.

6. The electrical dimmer device according to claim 3, wherein said means for determining the level of the voltage to which the voltage is varied once and the predetermined time during which the varied voltage is applied operates so that a response time when lowering the light transmissivity from the current value is equal to or less than one field period of time.

7. The electrical dimmer device according to claim 3, wherein said means for determining the level of the voltage to which the voltage is varied once and the predetermined time during which the varied voltage is applied operates so that a response time when raising the light transmissivity from the current value is equal to or less than one field period of time.

8. The electrical dimmer device according to claim 1, wherein said driving means varies the energy of the electric signal by changing a pulse width of the control signal.

9. The electrical dimmer device according to claim 8, where said driving means includes means for determining a value of the pulse width to which the pulse width is varied once and the predetermined time during which the varied pulse width is interposed depending on values of the respective pulse widths before varying the pulse width and after varying the pulse width.

10. The electrical dimmer device according to claim 9, wherein said means determining the value of the pulse width to be varied once and the predetermined time during which that varied pulse width is interposed uses a table that contains the values of the respective pulse widths before varying the pulse width and after varying the pulse width as reference values.

11. The electrical dimmer device according to claim 10, further comprising means for measuring an environmental temperature and changing over the values in the table depending on a measured environmental temperature.

12. The electrical dimmer device according to claim 9, wherein said means for determining the value of the pulse width to be varied once and the predetermined time during which the varied pulse width is interposed operates so that a response time when lowering the light transmissivity from the current value is equal to or less than one field period of time.

13. The electrical dimmer device according to claim 9, wherein said means for determining the value of the pulse width to be varied once and the predetermined time during which the varied pulse width is applied operates so that a response time when raising the light transmissivity from the current value is equal to or less than one field period of time.

14. The electrical dimmer device according to claim 1, wherein
the liquid crystal is a guest-host type liquid crystal that contains dichromatic dye molecules.

15. A driving method for an electrical dimmer device including a liquid crystal whose light transmissivity that is controlled by energy of an electric signal supplied thereto, characterized by
varying the energy of the electric signal that controls the light transmissivity of the liquid crystal,
wherein, when the light transmissivity is changed from its current value to a desired value, the driving means varies the energy of the electric signal to a greater extent than a change width corresponding to the change of the light transmissivity for a predetermined time before varying the energy to that corresponding to the desired value of the light transmissivity.

16. The driving method of an electrical dimmer device according to claim 15, the energy of the electric signal is changed in accordance with a change of the voltage of a control signal.

17. The driving method of an electrical dimmer device according to claim 16, further comprising determining a level of the voltage to which the voltage is varied once and the predetermined time during which the varied voltage is applied depending on values of the respective voltages before varying the voltage and after varying the voltage.

18. The driving method of an electrical dimmer device according to claim 17, wherein said determining the level of the voltage to which the voltage is varied once and the predetermined time during which the varied voltage in applied includes using a table that contains the values of the respective voltages before varying the voltage and after varying the voltage as reference values.

19. The driving method of an electrical dimmer device according to claim 18, further comprising measuring an environmental temperature and changing over the values in the table depending on a measured environmental temperature.

20. The driving method of a electrical dimmer device according to claim 17, wherein said determining the level of the voltage to which the voltage is varied once and the predetermined time during which that varied voltage is applied is performed so that a response time when lowering the light transmissivity from the current value is equal to or less than on field period of time.

21. The driving method of an electrical dimmer device according to claim 17, wherein said determining the level of the voltage to which the voltage is varied once and the predetermined time during which the varied voltage is applied is performed so that a response time when raising the light transmissivity from the current value is equal to or less than one field period or time.

22. The driving method of an electrical dimmer device according to claim 15, wherein the energy of the electric signal is accomplished by changing a pulse width of a control signal.

23. The driving method of an electrical dimmer device according to claim 22, wherein said determining value of the pulse width to be varied once and the predetermined time during which that varied pulse width is interposed depends on a value of the pulse widths before varying the pulse width and after varying the pulse width.

24. The driving method of an electrical dimmer device according to claim 23, wherein said determining the value of the pulse width to be varied once and the predetermined time during which that varied pulse width is interposed uses a table that contains the values of the pulse widths before varying the pulse width and after varying the pulse width as reference values.

25. The driving method of an electrical dimmer device according to claim 24, further comprising measuring an environmental temperature and changing over the values in the table depending on a measured environmental temperature.

26. The driving method of an electrical dimmer device according to claim 23, wherein said determining the value of the pulse width to be varied once and the predetermined time during which that varied pulse width is interposed is performed so that a response time when lowering the light transmissivity from the current value is equal to or less than one field period of time.

27. The driving method of an electrical dimmer device according to claim 23, wherein said determining the value of the pulse width to be varied once and the predetermined time during which that varied pulse width is interposed is performed so that a response time when raising the light transmissivity from the current value is equal to or less than one field period of time.

28. The driving method of an electrical dimmer device according to claim 15, wherein
the liquid crystal is a guest-host type liquid crystal that contains dichromatic dye molecules.

29. An imaging apparatus comprising:
an imaging unit that captures an image;
a liquid crystal unit that controls light inputted to the imaging unit; and
an energy control unit that controls light transmissivity of the liquid crystal unit by varying an energy of an electric signal,
wherein, when the light transmissivity of the liquid crystal unit is changed from its current value to a desired value, the energy control unit varies the energy of the electric signal to a greater extent than a change width corresponding to the change of the light transmissivity for a predetermined time before varying the energy to that corresponding to the desired value of the light transmissivity.

30. The imaging apparatus according to claim 29, wherein the energy control unit varies the energy of the electric signal by changing the voltage of a control signal fed to the liquid crystal unit.

31. The imaging apparatus according to claim 29, wherein the energy control unit varies the energy of the electric signal by changing a pulse width of a control signal fed to the liquid crystal unit.

32. The imaging apparatus according to claim 29, wherein the liquid crystal unit comprises a guest-host type liquid crystal that contains dichromatic dye molecules.

33. A method of controlling a light adjusting device of an imaging apparatus, the method characterized by:
providing a liquid crystal unit that controls light input to an imaging unit that captures an image
controlling a light transmissivity of the liquid crystal unit by varying an energy of an electric signal,
wherein, when the light transmissivity of the liquid crystal unit is changed from its current value to a desired value, the step of varying varies the energy of the electric signal to a greater extent than a change width corresponding to the change of the light transmissivity for a predetermined time before varying the energy to that corresponding to the desired value of the light transmissivity.

34. The method of controlling a light adjusting device of an imaging apparatus according to claim 33, wherein in the step of varying the energy of the electric signal is varied in accordance with a change of the voltage of a control signal fed to the liquid crystal unit.

35. The method of controlling a light adjusting device of an imaging apparatus according to claim 33, wherein in the step of varying the energy of the electric signal is varied by changing a pulse width of a control signal fed to the liquid crystal unit.

36. The method of controlling a light adjusting device of an imaging apparatus according to claim 33, wherein the step of providing includes providing a guesthost type liquid crystal that contains dichromatic dye molecules.

* * * * *

UNITED STATES PATENT AND TRADEMARK OFFICE
CERTIFICATE OF CORRECTION

PATENT NO. : 7,230,598 B2
APPLICATION NO. : 10/311656
DATED : June 12, 2007
INVENTOR(S) : Masaru Kawabata et al.

It is certified that error appears in the above-identified patent and that said Letters Patent is hereby corrected as shown below:

On the Title Page, item [57]:
IN THE ABSTRACT

Line 14, "time, of for example," should read -- time of, for example, --;

Column 1, line 41, "path in same way" should read -- path in the same way --;

Column 1, line 62, "it is difficult" should read -- it was difficult --;

Column 2, line 22, "like is used" should read -- like are used --;

Column 2, line 30, "which is" should read -- which are --;

Column 3, line 4, "invention is" should read --invention are --;

Column 3, line 19, "invention is applied." should read -- invention are applied. --;

Column 13, line 63, "$\alpha n$" should read -- $\Delta n$ --;

Column 28, line 45-46, "liquid crystald," should read -- liquid crystal, --;

Column 29, line 33, "where said" should read -- wherein said --;

Column 29, line 40, "means determining" should read -- means for determining --;

UNITED STATES PATENT AND TRADEMARK OFFICE
CERTIFICATE OF CORRECTION

PATENT NO.       : 7,230,598 B2
APPLICATION NO.  : 10/311656
DATED            : June 12, 2007
INVENTOR(S)      : Masaru Kawabata et al.

It is certified that error appears in the above-identified patent and that said Letters Patent is hereby corrected as shown below:

Column 30, line 15, "claim 15, the" should read -- claim 15, wherein the --;

Column 30, line 27, "voltage in" should read -- voltage is --;

Column 30, line 36, "of a electrical" should read -- of an electrical --;

Column 30, line 42, "than on field" should read -- than one field --:

Signed and Sealed this

Twenty-ninth Day of July, 2008

JON W. DUDAS
*Director of the United States Patent and Trademark Office*